(12) United States Patent
Chen

(10) Patent No.: US 10,836,152 B2
(45) Date of Patent: Nov. 17, 2020

(54) THREE-DIMENSIONAL PRINTING APPARATUS AND THREE-DIMENSIONAL PRINTING METHOD

(71) Applicants: XYZprinting, Inc., New Taipei (TW); Kinpo Electronics, Inc., New Taipei (TW)

(72) Inventor: Peng-Yang Chen, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 270 days.

(21) Appl. No.: 15/409,557

(22) Filed: Jan. 19, 2017

(65) Prior Publication Data

US 2018/0162068 A1    Jun. 14, 2018

(30) Foreign Application Priority Data

Dec. 8, 2016 (CN) .......................... 2016 1 1119922

(51) Int. Cl.
*B29C 64/40* (2017.01)
*B29C 64/129* (2017.01)
(Continued)

(52) U.S. Cl.
CPC .......... *B33Y 50/02* (2014.12); *B29C 35/0805* (2013.01); *B29C 64/129* (2017.08);
(Continued)

(58) Field of Classification Search
CPC ..... B29C 64/40; B29C 64/129; B29C 64/106; B29C 64/209; B29C 64/218; B33Y 30/00; B33Y 50/02; B33Y 10/00
See application file for complete search history.

(56) References Cited

U.S. PATENT DOCUMENTS 10,214,002 B2 * 2/2019 Pang ..................... B29C 64/241
2011/0310370 A1 * 12/2011 Rohner .............. A61C 13/0013
355/53

(Continued)

FOREIGN PATENT DOCUMENTS

CN        104647752        5/2015
CN        205573045        9/2016

OTHER PUBLICATIONS

"Office Action of China Counterpart Application," dated Aug. 1, 2019, p. 1-p. 10.

*Primary Examiner* — Alison L Hindenlang
*Assistant Examiner* — Debjani Roy
(74) *Attorney, Agent, or Firm* — JCIPRNET

(57) ABSTRACT

A three-dimensional printing apparatus and a three-dimensional printing method are provided. The three-dimensional printing apparatus includes a tank, an injection module, a platform movably disposed above the bottom of the tank, a curing module, and a control module. The tank has a forming area and a separating area in a stepped manner on a bottom thereof, and the forming area is higher than the separating area. The injection module includes a storage tank and an injection pipe connected thereto, and a forming material is filled therein to be applied to the forming area. The curing module is disposed beside the tank or the platform to cure the forming material between the platform and the forming area to be a curing layer. The control module is electrically connected to the injection module, the curing module, and at least one of the tank and the platform to perform a relative movement.

9 Claims, 9 Drawing Sheets

(51) Int. Cl.
*B33Y 10/00* (2015.01)
*B33Y 30/00* (2015.01)
*B29C 64/386* (2017.01)
*B33Y 50/02* (2015.01)
*B29C 35/08* (2006.01)

(52) U.S. Cl.
CPC ............ *B29C 64/386* (2017.08); *B29C 64/40* (2017.08); *B33Y 10/00* (2014.12); *B33Y 30/00* (2014.12); *B29C 2035/0833* (2013.01)

(56) References Cited

U.S. PATENT DOCUMENTS

| | | | | |
|---|---|---|---|---|
| 2013/0292862 | A1* | 11/2013 | Joyce | B29C 64/35 264/40.1 |
| 2014/0339741 | A1* | 11/2014 | Aghababaie | B29C 64/20 264/401 |
| 2015/0165678 | A1* | 6/2015 | Ding | B33Y 30/00 425/150 |
| 2015/0321421 | A1* | 11/2015 | Ding | B33Y 50/02 264/401 |
| 2015/0352782 | A1* | 12/2015 | Lisitsin | C09D 133/14 264/401 |

* cited by examiner

THREE-DIMENSIONAL PRINTING APPARATUS AND THREE-DIMENSIONAL PRINTING METHOD

CROSS-REFERENCE TO RELATED APPLICATION

This application claims the priority benefit of China application serial no. 201611119922.X, filed on Dec. 8, 2016. The entirety of the above-mentioned patent application is hereby incorporated by reference herein and made a part of this specification.

BACKGROUND

Technical Field

The technical field relates to a three-dimensional printing apparatus and a three-dimensional printing method, and more particularly relates to a three-dimensional printing apparatus having an injection module and a three-dimensional printing method.

Description of Related Art

With the increasing development of technology, many different methods using additive manufacturing technology such as layer-by-layer model construction have been proposed for building physical three-dimensional (3-D) models. Generally, additive manufacturing technology is to convert design data of a 3-D model constructed by software such as computer-aided design (CAD) or the like into a plurality of continuously stacked thin (quasi-two-dimensional) cross-sectional layers.

Currently, many ways to form a plurality of thin cross-sectional layers have been developed. For example, a moving platform is installed in a liquid forming material. Then, a light source driven by an X-Y-Z coordinate system constructed according to design data of a 3-D model moves along the X-Y coordinate and irradiates the liquid forming material, so as to cure the liquid forming material into a correct shape of the cross-sectional layer. Then, as the moving platform moves along the Z-axis, the liquid forming material may be formed into a 3-D object while being cured and stacked layer by layer.

SUMMARY

Embodiments of the disclosure provide a three-dimensional printing apparatus and a three-dimensional printing method in which injection is performed during printing and a curing layer is effectively separated, and thus printing efficiency is improved.

The three-dimensional printing apparatus includes a tank, an injection module, a platform, a curing module, and a control module. The tank has a forming area and a separating area on a bottom thereof. The forming area and the separating area are in a stepped shape, and the forming area is higher than the separating area. The injection module includes a storage tank and an injection pipe connected to the storage tank. A forming material is for being filled into the injection module. By the injection pipe passing through the forming area, the forming material is applied to the forming area. The platform is movably disposed above the bottom of the tank. The curing module is disposed beside the tank or the platform and is configured to cure the forming material between the platform and the forming area, so as to form a curing layer on the platform. The control module is electrically connected to the injection module, the curing module, and at least one of the tank and the platform. In addition, the control module drives the tank and the platform to perform a relative movement, such that the platform switchably corresponds to the forming area and the separating area, wherein when the platform correspondingly moves away from the forming area or correspondingly moves towards the forming area, the injection module applies the forming material to the forming area.

The three-dimensional printing method is suitable for the aforementioned three-dimensional printing apparatus for printing a three-dimensional object on the platform. The three-dimensional printing method includes the following steps. The forming material is provided to the forming area. Then, the forming material between the platform and the forming area is cured to form the curing layer. Afterward, the tank or the platform is driven to perform a relative movement between the tank and the platform, such that the curing layer is separated from the forming area to move to the separating area. Then, the tank or the platform is driven again, such that the platform corresponds to the forming area, wherein when the platform moves from the forming area to the separating area, or when the platform moves from the separating area back to the forming area, the injection module is driven to apply the forming material to the forming area.

Based on the above, in the embodiments of the disclosure, the bottom of the tank of the three-dimensional printing apparatus is divided into the forming area and the separating area which are in a stepped shape, wherein the higher forming area is used as an area for forming the curing layer. The tank and the platform perform a relative movement therebetween, so as to separate the curing layer from the forming area by using a shear force, thereby facilitating subsequent formation of a next curing layer. In addition, since the three-dimensional printing apparatus has the injection module disposed therein, at the same time of the relative movement during a printing process, the injection pipe in the injection module applies the forming material onto a surface of the forming area, so as to continue to cure and stack the next curing layer. In other words, by the three-dimensional printing apparatus and the three-dimensional printing method of the embodiments, during every printing operation, the injection module only needs to perform injection for the layer to be printed, and the injection may be performed at the same time as the relative movement occurring during printing. Therefore, printing efficiency can be improved.

In order to make the aforementioned and other features and advantages comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
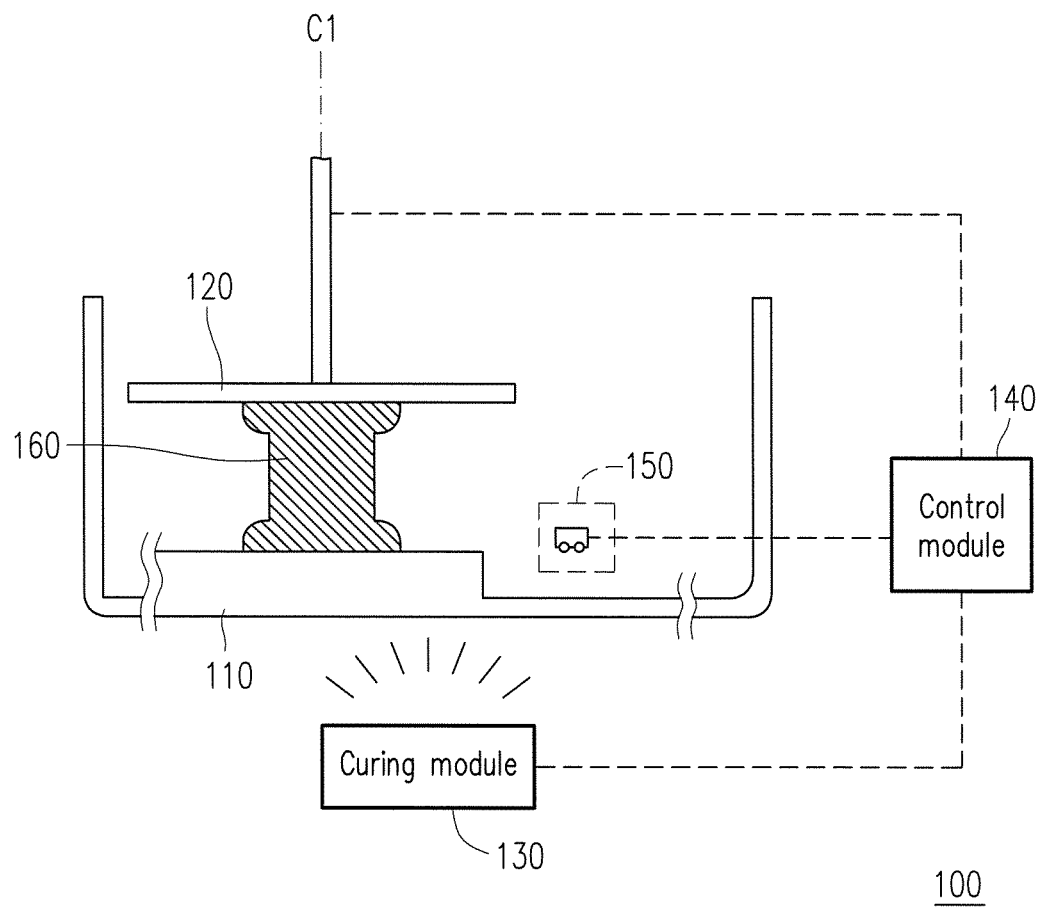
FIG. 1 is a side view of a three-dimensional printing apparatus according to an embodiment.

The aforementioned and other technical contents, features, and effects of the disclosure are clearly presented in the detailed descriptions of the embodiments with reference to the drawings. The directional terms mentioned in the following embodiments, for example, "up," "down," "front," "back," "left," "right," "bottom," "top," and so on, merely refer to the directions in the accompanying drawings. Therefore, the directional terms are used to illustrate rather than limit the disclosure. In addition, in the following embodiment, the same or similar reference numerals denote the same or similar elements.

Figure 2:
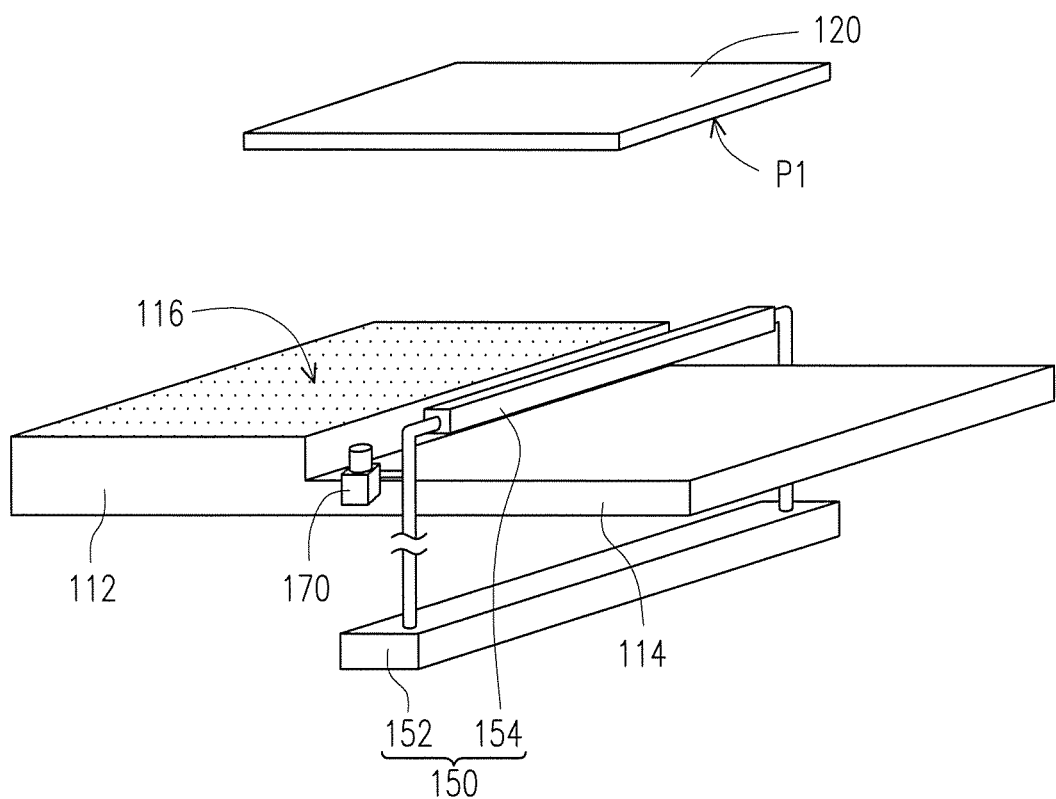
FIG. 2 is a schematic partial view of the three-dimensional printing apparatus in FIG. 1.

FIG. 1 is a side view of a three-dimensional printing apparatus according to an embodiment. FIG. 2 is a schematic partial view of the three-dimensional printing apparatus in FIG. 1, in which a tank is omitted. Referring to FIG. 1 and FIG. 2 together, in the present embodiment, a three-dimensional printing apparatus 100 includes a tank 110, a platform 120, a curing module 130, a control module 140, and an injection module 150. A bottom of the tank 110 is in a stepped shape, having a forming area 112 and a separating area 112, and the forming area 112 is higher than the separating area 114. Besides, a coating layer 116 is disposed on a surface of the forming area 112, and the coating layer 116 is polytetrafluoroethene (PTFE) or polydimethylsiloxane (PDMS), for example. The injection module 150 includes a storage tank 152 and an injection pipe 154, wherein the storage tank 152 is connected to the injection pipe 154. A forming material is for being filled into the injection module 150. The injection pipe 154 has a ball or a hole thereon, and is thus suitable for applying the forming material to the surface of the forming area 112. In the above, the injection pipe 154 is disposed above the separating area 114 corresponding to the tank 110. When the injection pipe 154 of the present embodiment is in a nonprinting state, the injection pipe 154 does not contact the forming area 112. The injection module 150 in FIG. 1 is shown with its components omitted, which will be described in detail later. The platform 120 is movably disposed above the bottom of the tank 110. The curing module 130 is disposed beside the tank 110 or the platform 120 and is configured to cure the forming material between the platform 120 and the tank 110, so as to form at least one curing layer on the platform 120. After curing layers are cured and stacked layer by layer, a three-dimensional object 160 is formed in the end. The control module 140 is electrically connected to at least one of the platform 120 and the tank 110, the injection module 150, and the curing module 130, so as to drive the tank 110 and the platform 120 to perform a relative movement, such that a printing area of the platform 120 switchably corresponds to the forming area 112 and the separating area 114. The expression "correspond" mentioned here means that the printing area of the platform 120 can move to right above the forming area 112 of the tank 110 or right above the separating area 114 of the tank 110 at different times, wherein the control module 140 controls and adjusts the platform 120 and the forming area 112 to maintain a required relative distance therebetween.

Herein, the three-dimensional printing apparatus 100 is, for example, a stereolithography (SL) apparatus or a digital light processing (DLP) apparatus. The forming material is, for example, a photosensitive resin. By the control module 140 driving the curing module 130 such as a curing light source to perform irradiation, the forming material is cured and shaped on the printing area of the platform 120. However, the disclosure is not limited thereto. Any material capable of forming the aforementioned three-dimensional object and its corresponding active manufacturing means may be applied. Based on the above, in the present embodiment, by means of the curing module 130, the forming material is cured and stacked layer by layer on a forming plane P1 of the platform 120, and with the relative movement between the tank 110 and the platform 120 being performed, the three-dimensional object 160 is formed in the end.

In addition, the disclosure does not limit the quantity of the curing module 130 and the position of the curing module 130 relative to the tank 110. Although the present embodiment illustrates that the curing module 130 is below the tank 110, the curing module 130 can substantially be disposed correspondingly according to requirements for formation. That is, on the premise that the curing module 130 effectively cures and shapes the forming material on the platform 120 so as to gradually form a three-dimensional object in accordance with a bottom-up lifting movement of the platform 120, the curing module 130 can be located in a suitable position beside the tank 110 or beside the platform 120.

A function of the injection module 150 is to apply the forming material inside the injection module 150 to the surface of the forming area 112 for facilitating the subsequent formation of curing layers. Therefore, the injection module 150 mainly includes the storage tank 152 and the injection pipe 154 which may be disposed in roughly two manners: the storage tank being disposed above the injection pipe, and the storage tank being disposed below the injection pipe. If the storage tank is disposed above the injection pipe, due to gravity, the forming material inside the injection module smoothly flows from the storage tank to the injection pipe, without a need to discharge the forming material by an additional pressure apparatus or power apparatus. If the storage tank is disposed below the injection pipe, the storage tank or the injection pipe must be additionally connected to a pump to thereby pump the forming material from the storage tank to the injection pipe. In the present embodiment, for exemplary purposes only, FIG. 2 illustrates that the storage tank 152 of the injection module 150 is below the tank 110, and the storage tank 152 is connected to the injection pipe 154 located above the storage tank 152. Therefore, the forming material inside the injection module 150 can be pumped from the storage tank 152 to the injection pipe 154 by a pump 170, and then, through the ball or hole on the injection pipe 154, the forming material can flow out (injected) to be applied to the surface of the forming area 112. However, the disclosure is not limited thereto. In the injection module 150, the storage tank 152 may also be disposed above the injection pipe 154 or in other positions relative to the tank 110. That is, any means capable of applying the forming material to the surface of the forming area 112 may be applied.

Figure 3A:
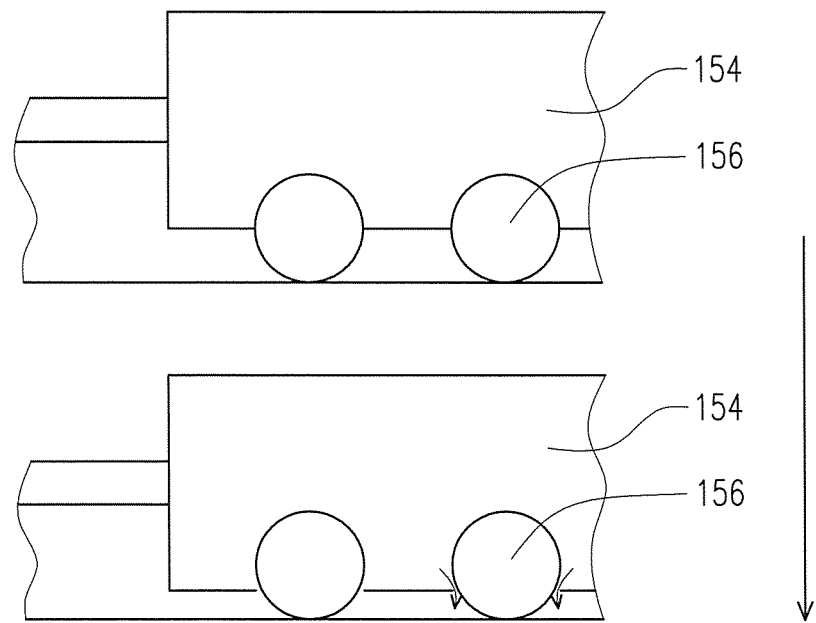
FIG. 3A and FIG. 3B respectively illustrate schematic partial views of an injection module according to different embodiments.
Figure 3B:
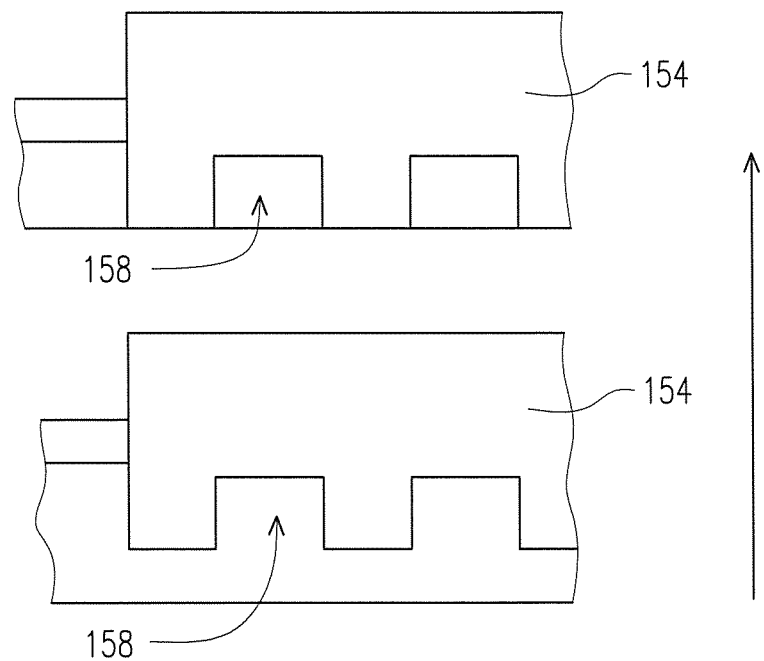

It is noted that, during the printing process, when a previous printing operation is completed and the next curing layer is to be formed, the forming material should be applied to the surface of the forming area 112 before the printing is continued. Since the injection pipe 154 of the injection module 150 has the ball or the hole thereon, the forming material inside the injection module 150 can thus flow out to be applied to the surface of the forming area 112. FIG. 3A and FIG. 3B respectively illustrate schematic partial views of an injection module according to different embodiments. FIG. 3A shows a case where the injection pipe 154 has a ball thereon, and FIG. 3B shows a case where the injection pipe 154 has a hole thereon.

In one embodiment, as shown in FIG. 3A, the injection pipe 154 has a plurality of balls 156 thereon. The balls 156 are rotatably and movably disposed in a groove of the injection pipe 154. In addition, when the balls 156 are not subject to other forces, the balls 156 can be used to block the forming material inside the injection module 150 from flowing out. During the printing process, when the injection pipe 154 passes through an area, for example, the surface of the forming area 112 in the present embodiment, to which the forming material is to be injected, by driving to press down the injection pipe 154 of the injection module 150, the balls 156 are pushed by the surface of the forming area 112 to move up. After the balls 156 have left their original positions, a gap is created between the balls 156 and the groove where they are located, such that the forming material located inside the injection pipe 154 smoothly flows out (in FIG. 3A, a downward small arrow beside the balls 156 indicates a direction in which the forming material flows out through the gap between the balls 156 and the groove where they are located.) That is, in the embodiment of FIG. 3A, by driving to press the injection pipe 154 against the surface of forming area 112, the balls 156 abut the forming area 112 and retract toward the injection pipe 154. In other words, when the injection pipe 154 is driven to be pressed against the bottom of the tank, the balls 156 retract into the groove where they are located, such that the forming material flows out to be applied to the surface of the forming area 112 via the rolling balls 156. By contrast, after the injection is completed, the injection pipe 154 is lifted to restore the balls 156 into the groove where they are located, such that the forming material stops flowing out. The ball-type injection pipe is suitable for the injection module 150 illustrated in aforementioned FIG. 1 and FIG. 2, allowing the injection module 150 to be completely moved away from the higher part of the bottom of the tank 110 in the nonprinting state.

In another embodiment, as shown in FIG. 3B, the injection pipe 154 has a plurality of holes 158 thereon. By closely attaching the injection pipe 154 to the bottom of the tank 110, openings of the holes 158 closely abut against the bottom of the tank 110, such that the holes 158 are sealed and the forming material located inside the injection module 150 is prevented from flowing out. During the printing process, when the injection pipe 154 passes through the area, for example, the surface of the forming area 112 in the present embodiment, to which the forming material is to be injected, by driving to lift up the injection pipe 154, a gap is created between the injection pipe 154 and the forming area 112. At this moment, the holes 158 are no longer sealed, and the forming material thus smoothly flows out. That is, in the embodiment of FIG. 3B, by driving to lift up the injection pipe 154 to move the injection pipe 154 away from the surface of the forming area 112, the holes 158 are opened outward and the forming material can thus be applied to the surface of the forming area 112. The hole-type injection pipe described herein is suitable for another embodiment that is not illustrated. That is, as shown in FIG. 2, the forming area 112 only takes up a portion of the higher part of the bottom of the tank 110, so as to allow the hole-type injection pipe while not in use to remain in its position at the higher part (non-forming area) and closely abut against the forming area 112, so as to stop the forming material from flowing out.

In other embodiments, the hole 158 on the injection pipe 154 can also be replaced by a nozzle (not illustrated). Accordingly, by pressurization by the pump 170, the forming material can flow out from the nozzle. The nuzzle-type injection pipe is suitable for use in the state illustrated in the embodiment as shown in FIG. 2.

Figure 4:
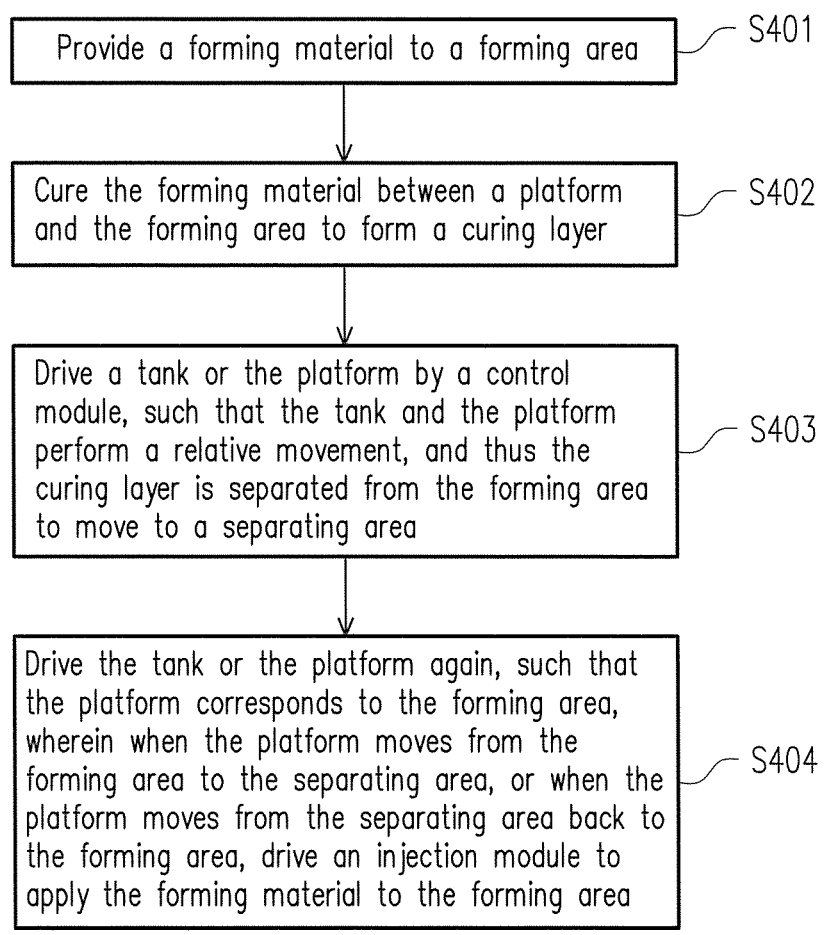
FIG. 4 is a flowchart of a three-dimensional printing method according to an embodiment.

According to the three-dimensional printing method of the disclosure, FIG. 4 is a flowchart of a three-dimensional printing method according to an embodiment, which is suitable for the aforementioned three-dimensional printing apparatus for printing a three-dimensional object on the platform. The three-dimensional printing apparatus 100 includes the tank 110, the platform 120, the curing module 130, the control module 140, and the injection module 150. Relevant descriptions of the three-dimensional printing apparatus 100 may be found in the aforementioned embodiments and will not be repeated herein. Referring to FIG. 2 and FIG. 4 together, first, step S401 is performed, in which the forming material is provided to the forming area 112. Then, step S402 is performed, in which the forming material between the platform 120 and the forming area 112 is cured to form a curing layer. The forming material is, for example, a liquid photosensitive resin. Therefore, when the forming material is irradiated by a curing light source provided by the curing module 130, the forming material is cured and shaped on the platform 120 so as to form the curing layer. To be more exact, the curing only occurs in an area irradiated by the curing light source. The area irradiated by the curing light source is determined by the design of a profile layer of the three-dimensional object to be formed, and is not comprehensively irradiated. Therefore, in step S402, the curing reaction only occurs in an area between the platform 120 and the forming area 112 which contains the forming material. After the curing layer is formed, step S403 is performed, in which the control module 140 drives the tank 110 or the platform 120, such that the tank 110 and the platform 120 perform a relative movement, and thus the curing layer is separated from the forming area 112 to move to the separating area 114 via shear force generated therefrom. Afterward, step S404 is performed, in which the tank 110 or the platform 120 is driven again, such that the platform 120 corresponds to the forming area 112, wherein when the platform 120 moves from the forming area 112 to the separating area 114, or when the platform 120 moves from the separating area 114 back to the forming area 112, the injection module 150 is driven to apply the forming material to the forming area 112.

To be more specific, the relative movement herein refers to, for example, rotation, translation, moving close, moving away, or a combination thereof. For example, a control module 140 can drive the tank 110 to translate relative to the platform 120. Accordingly, the curing layer formed in step S402 translates with the platform 120, and is thus separated from the forming area 112 to move to a position corresponding to the separating area 114. Also, due to the stepped-shaped structure of the bottom of the tank 110, the curing layer is substantially suspended above the separating area 114. Accordingly, during the printing process, the relative movement between the tank 110 and the platform 120 is performed many times, such that the platform 120 repeatedly switches between the states corresponding to the forming area 112 and corresponding to the separating area 114. Therefore, when the platform 120 moves from the forming area 112 to the separating area 114, or when the platform 120 moves from the separating area 114 back to the forming area 112, by driving the injection module 150 at the same time, the injection pipe 154 of the injection module 150 applies the forming material to the forming area 112 while passing through the forming area 112. The relevant printing steps will be described in detail later. Besides, the aforementioned coating layer 116 disposed on the surface of the forming area 112 conduces to reduction in viscous force and friction force between the curing layer and the forming area 112, so as to smoothly separate the curing layer from the forming area 112. Accordingly, the relative translation movement separates the curing layer from the bottom of the tank 110 by a shear force, which avoids spending more manufacturing time applying a force along a central axis C1, i.e., normal to the forming area 112.

Figure 5:
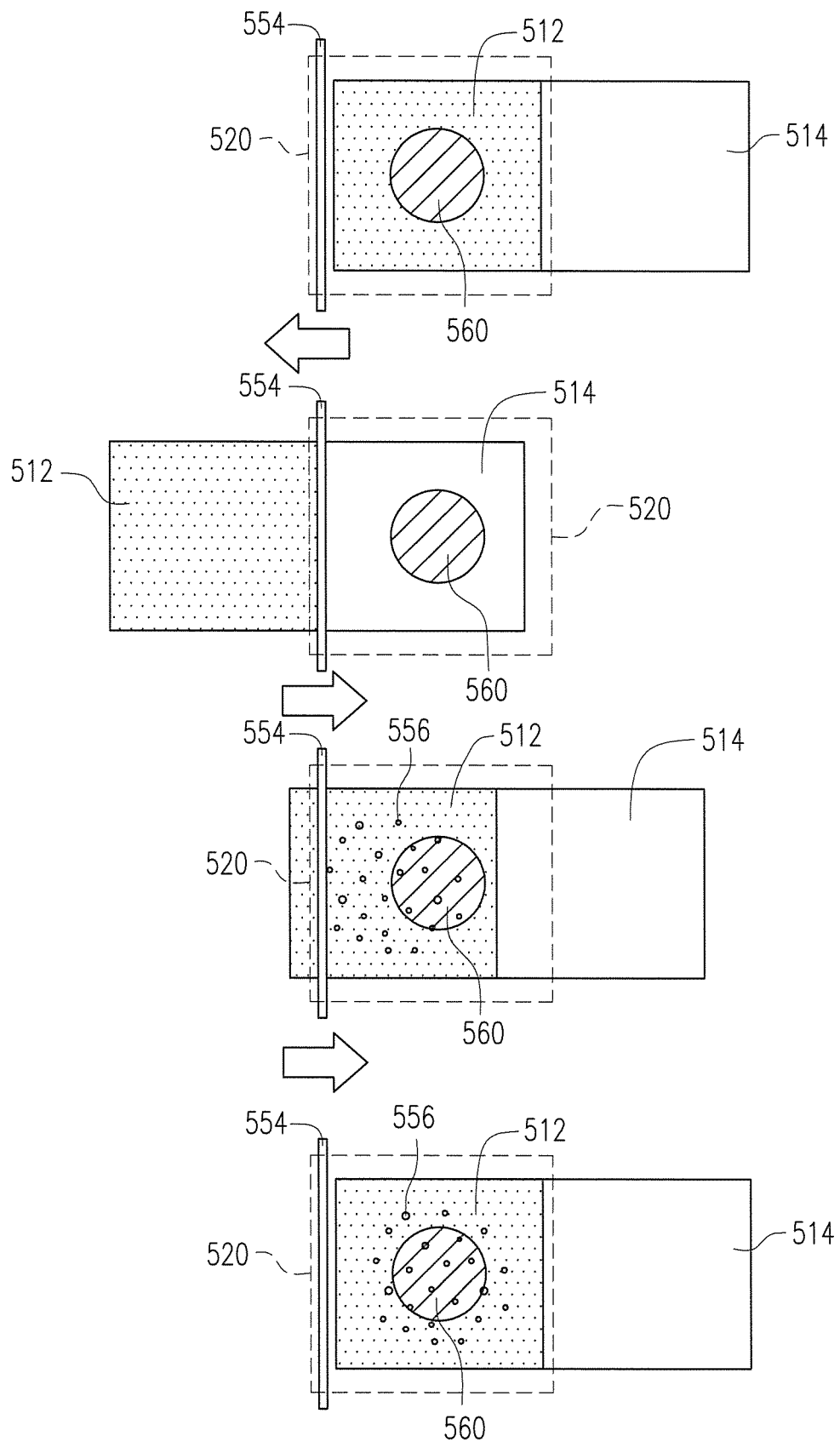
FIG. 5 is a schematic partial top view of a state in which a three-dimensional printing method according to an embodiment is applied.

FIG. 5 is a schematic partial top view of a state in which the three-dimensional printing method according to an embodiment is applied. In FIG. 5, a platform 520 is a structure disposed relative to the tank, having thereon a printing area for forming a curing layer 560, and the printing area on the platform 520 switchably corresponds to a forming area 512 and a separating area 514 by a relative movement between the platform and the tank. Herein, the platform 520 is illustrated in dashed lines for ease of identification. In the present embodiment, an injection pipe 554 is disposed between the platform 520 and the tank having the forming area 512 and the separating area 514, and the injection pipe 554 is fixed onto the platform. However, the disclosure is not limited thereto. In other embodiments not shown, the injection pipe 554 can also be configured to move relative to the tank or the platform. The three-dimensional printing method of the present embodiment is performed with reference to the aforementioned step S401 to step S404 in FIG. 4, and by repeating step S401 to step S404, the three-dimensional object is formed in the end. More particularly, in step S401, the method for providing the forming material to the forming area 512 further includes the following steps (the state illustrated here is when the previous printing has been completed and the curing layer 560 has been formed, and the next curing layer is to be formed). First, the tank is driven to move relative to the platform 520 (the moving direction shown in FIG. 5 is leftward), such that the printing area of the platform 520 corresponds to the separating area 514. At this moment, the curing layer 560 formed in the previous printing process is separated from the forming area 512 to move to the separating area 514. Then, the tank is driven again to move relative to the platform 520 (the moving direction shown in FIG. 5 is rightward), such that the printing area of the platform 520 corresponds to the forming area 512. More particularly, during the rightward movement of the tank relative to the platform 520, the injection module is driven to perform injection. In detail, when the injection pipe 554 passes through the forming area 512, a forming material 556 is applied to the forming area 512, and after application of the forming material 556 is completed, the forming material 556 is cured by performing step S402, so as to form the next curing layer. The relevant descriptions of using the injection pipe 554 to apply the forming material 556 to the forming area 512 are similar to those in the aforementioned embodiments, and will not be repeated herein.

FIG. 6A to FIG. 6F are schematic partial top views of a state in which the three-dimensional printing method according to an embodiment is applied. In FIG. 6A to FIG. 6F, a platform 620 is a structure disposed relative to the tank, having thereon a printing area for forming a first curing layer 660a and a second curing layer 660b, and the printing area on the platform 620 switchably corresponds to a forming area 612, a first separating area 614a and a second separating area 614b by a relative movement between the platform and the tank. Herein, the platform 620 is illustrated in dashed lines for ease of identification. In the present embodiment, the forming area 612 is located between the first separating area 614a and the second separating area 614b. An injection pipe 654 is disposed between the platform 620 and the tank having the forming area 612, the first separating area 614a and the second separating area 614b, and the injection pipe 654 is fixed onto the platform. A curing light source 632 is movable.

Figure 6A:
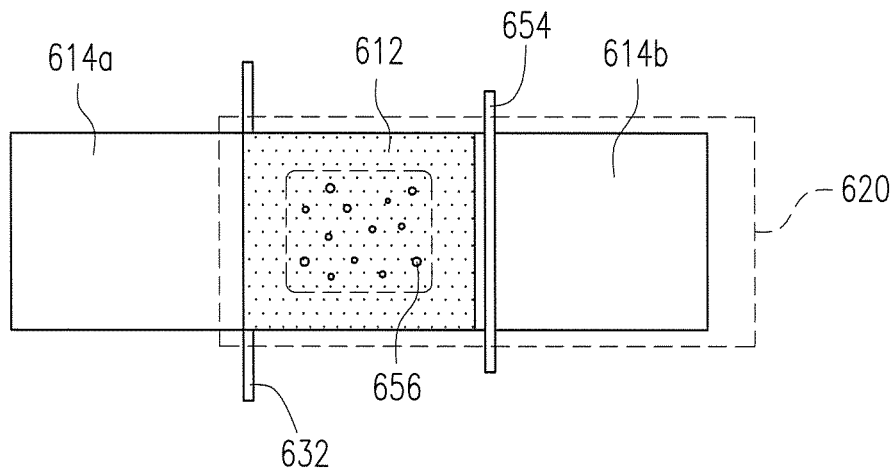
FIG. 6A to FIG. 6F are schematic partial top views of a state in which the three-dimensional printing method according to an embodiment is applied.
Figure 6B:
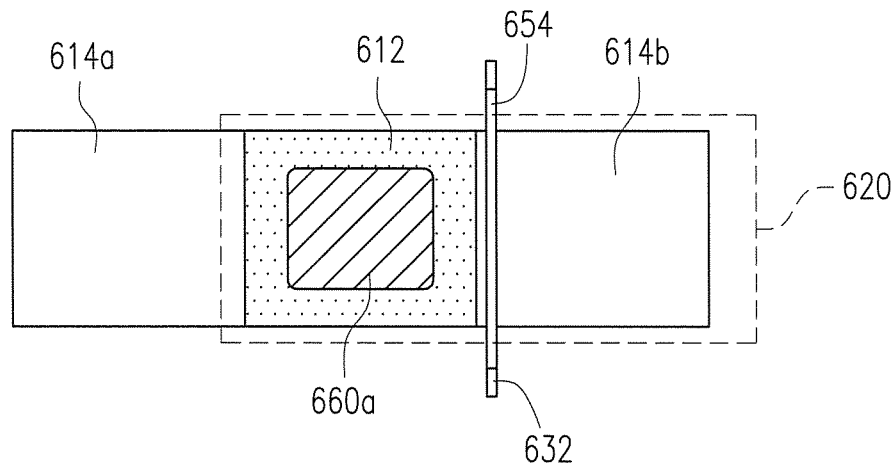
Figure 6C:
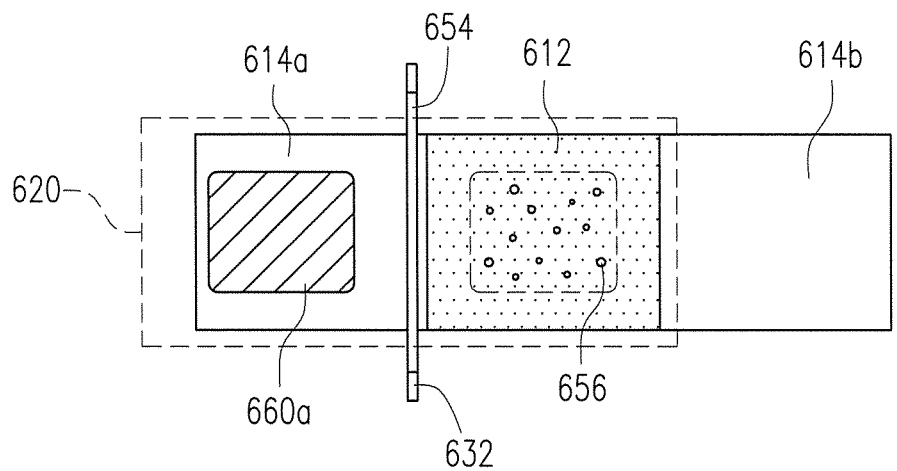
Figure 6D:
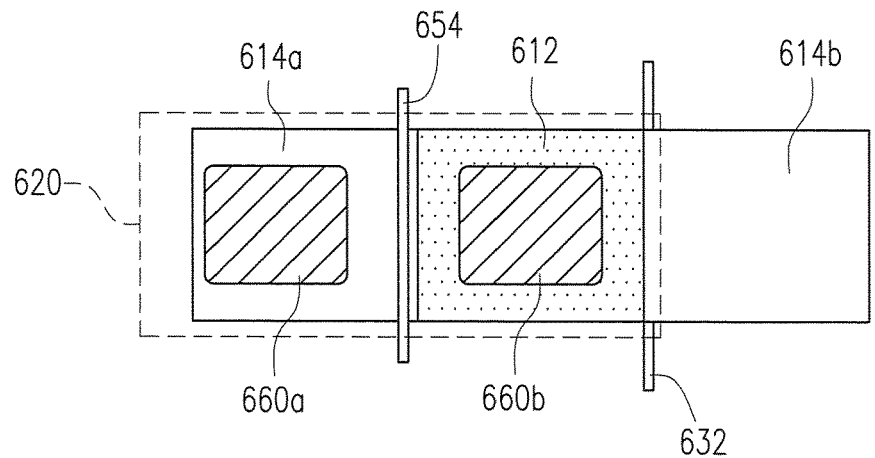
Figure 6E:
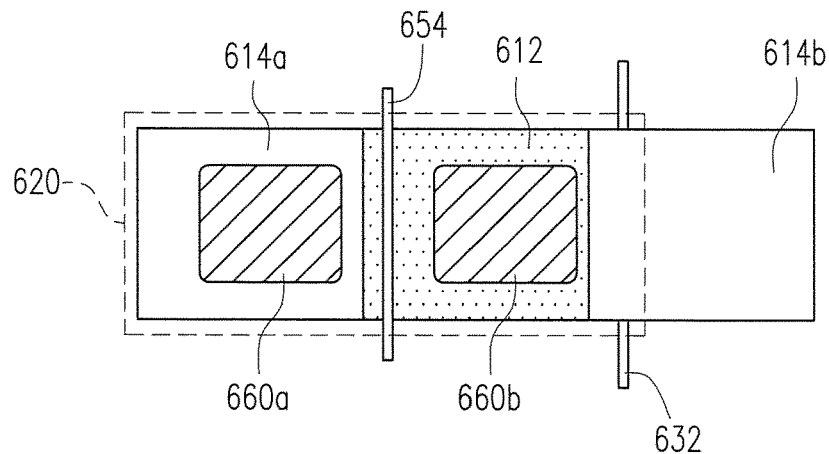
Figure 6F:
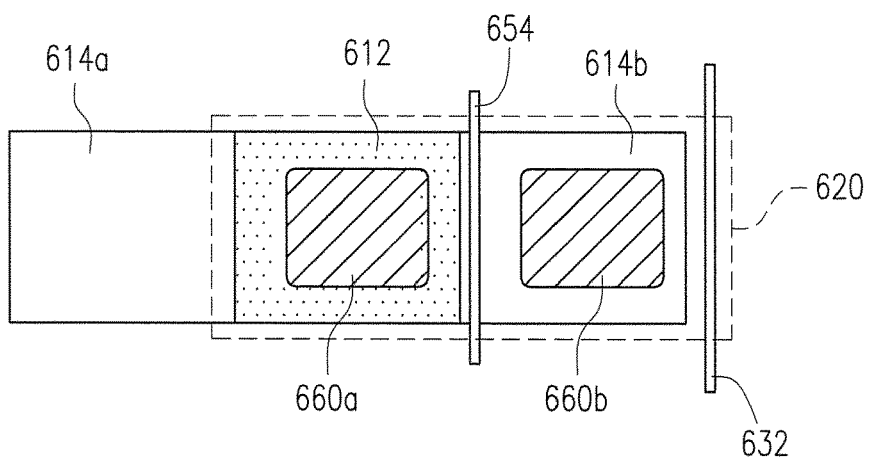

The three-dimensional printing method of the present embodiment is performed with reference to the aforementioned step S401 to step S404 in FIG. 4, and by repeating step S401 to step S404, the three-dimensional object is formed in the end. In detail, the printing process from step S401 to step S404 further includes the following steps (the state illustrated here is when the previous injection has been completed and the printing is to be continued). Referring to FIG. 6A to FIG. 6F, a forming material 656 has been applied onto the forming area 612 in advance. Then, the curing light source 632 is moved to cure the forming material 656 between the platform 620 and the forming area 612 so as to form the first curing layer 660a. At this moment, the curing light source 632 is moved from a position corresponding to the junction of the first separating area 614a and the forming area 612 to another position corresponding to the junction of the second separating area 614b and the forming area 612, and overlaps the position of the injection pipe 654. Afterward, as shown in FIG. 6C, the tank or the platform 620 is driven, such that the tank and the platform 620 perform a relative movement, and thus the first curing layer 660a is separated from the forming area 612 to move to the first separating area 614a. During the movement, the injection pipe 654 passes through the forming area 612 to apply the forming material 656 to the forming area 612. Next, referring to FIG. 6D, the curing light source 632 is moved again to cure the forming material 656 between the platform 620 and the forming area 612, so as to form the second curing layer 660b. At this moment, the curing light source 632 is moved from a position corresponding to the junction of the first separating area 614a and the forming area 612 to another position corresponding to the junction of the second separating area 614b and the forming area 612. Afterward, the tank or the platform 620 is driven, such that the tank and the platform 620 relatively move away from each other to create a gap between the second curing layer 660b and the forming area 612. In other words, after the tank and the platform 620 relatively move away from each other, the second curing layer 660b is separated from the forming area 612. However, the second curing layer 660b is still suspended above the forming area 612 at this moment. Finally, as shown in FIG. 6E to FIG. 6F, the tank or the platform 620 is driven again, such that the tank and the platform 620 simultaneously or sequentially move relatively and away from each other, and thus the second curing layer 660b is separated from the forming area 612 to move to the second separating area 614b. Besides, during the process (from FIG. 6E to FIG. 6F), the platform and the tank can also be driven to relatively move away from each other (to form the aforementioned gap), and the forming material is applied again to the forming area 612 at the same time. The relevant descriptions of using the injection pipe 654 to apply the forming material to the forming area 612 are similar to those in the aforementioned embodiments, and will not be repeated herein.

Figure 7:
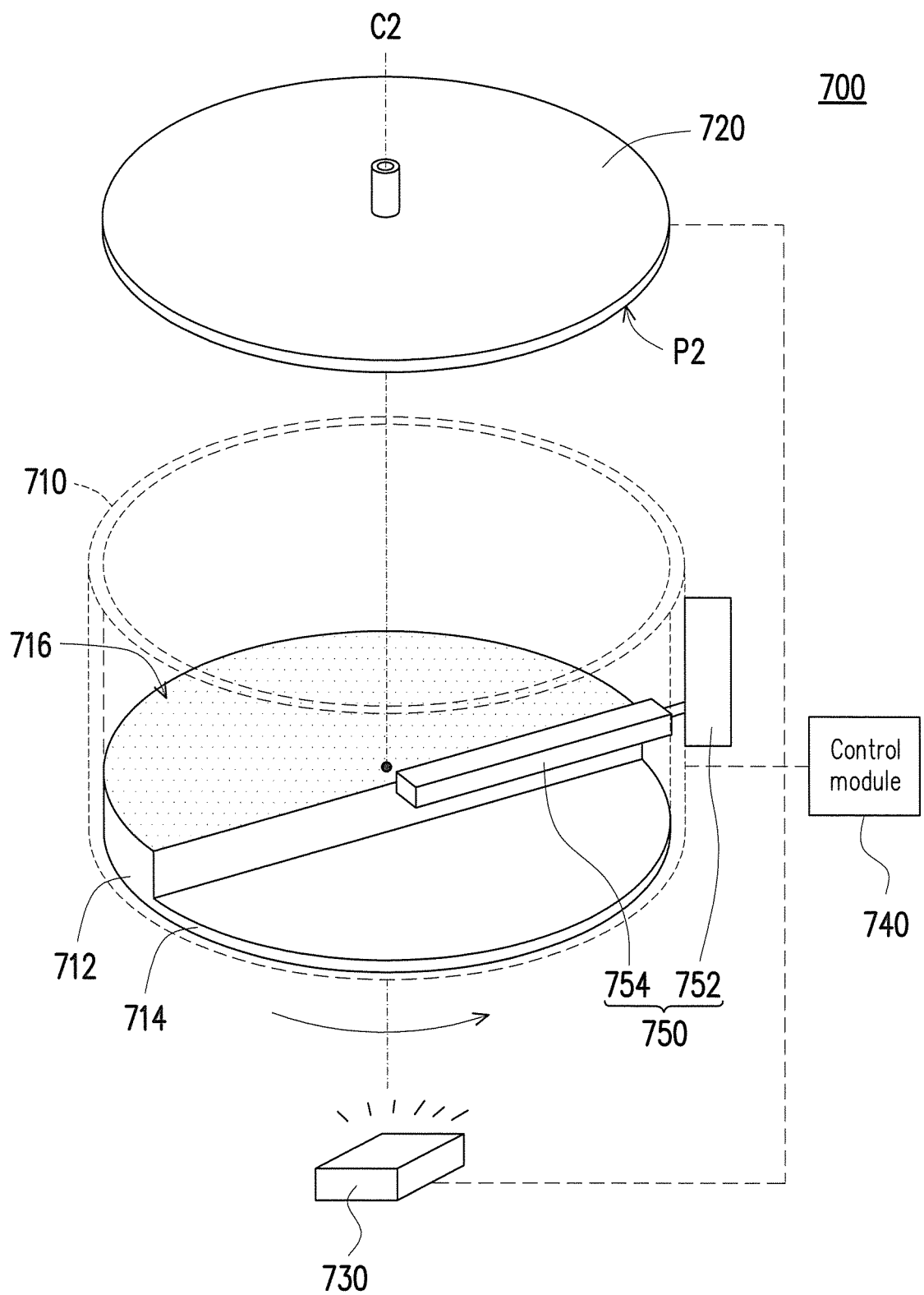
FIG. 7 is a schematic partial view of a three-dimensional printing apparatus according to another embodiment.

FIG. 7 is a schematic partial view of a three-dimensional printing apparatus according to another embodiment. In other embodiments, as shown in FIG. 7, a three-dimensional printing apparatus 700 includes a tank 710, a platform 720, a curing module 730, a control module 740, and an injection module 750. A bottom of the tank 710 is in a stepped shape, having a forming area 712 and a separating area 714, wherein the forming area 712 is higher than the separating area 714, and a coating layer 716 is disposed on a surface of the forming area 712, similarly to the coating layer 116 in the embodiment of FIG. 2. The platform 720 is movably disposed above the bottom of the tank 710, and by the curing module 730, the forming material is cured and stacked layer by layer on a forming plane P2 of the platform 720, and with a relative movement between the tank 710 and the platform 720 being performed, a three-dimensional object is formed in the end.

In detail, the bottom of the tank 710 has a circular profile and is controlled to rotate about a central axis C2. Rotation angles of the forming area 712 and the separating area 714 on the bottom of the tank 710 relative to the circular profile are respectively 180 degrees (that is, the angles of circumference of the forming area 712 and the separating area 714 relative to the circular tank 710 are respectively 180 degrees). That is, as the tank 710 performs a single rotation of 180 degrees, a printing area on the forming plane P2 of the platform 720 switches between the states corresponding to the forming area 712 and corresponding to the separating area 714.

Figure 8:
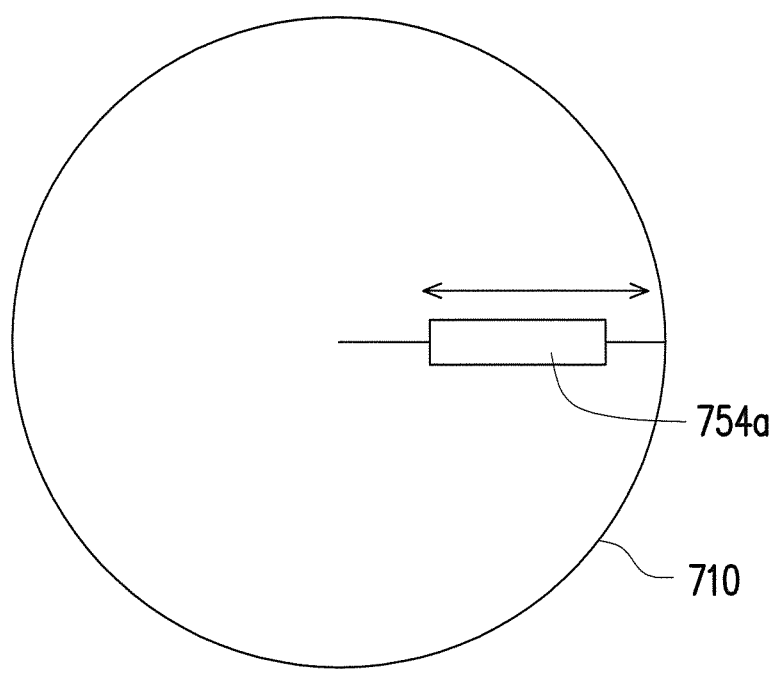
FIG. 8 illustrates a schematic view of an arrangement of an injection pipe according to another embodiment.

The injection module 750 includes a storage tank 752 and an injection pipe 754, wherein the storage tank 752 is connected to the injection pipe 754. A forming material is for being filled into the injection module 750. The injection pipe 754 has a ball or a hole thereon, and is thus suitable for applying the forming material to the surface of the forming area 712. In the above, the injection pipe 754 is disposed above the separating area 714 corresponding to the tank 710. In other words, in the nonprinting state, the injection pipe 754 does not contact the forming area 712, and similarly to the aforementioned embodiments, a nuzzle-type injection pipe or a ball-type injection pipe may be applied as the injection pipe 754. More particularly, the injection pipe 754 is disposed between the platform 720 and the tank 710, and an extension direction of the injection pipe 754 is disposed along a radial direction of the circular profile. In the embodiment of FIG. 7, a length of the injection pipe 754 corresponding to the tank 710 is illustrated to be equal to a radius of the circular profile. However, the disclosure is not limited thereto. For example, the length of the injection pipe 754 corresponding to the tank 710 can also be equal to a diameter of the circular profile. In other words, the length of the injection pipe 754 corresponding to the tank 710 is not limited in the disclosure, and can substantially be configured according to the requirements for formation. For example, FIG. 8 illustrates a schematic view of an arrangement of an injection pipe according to another embodiment, in which most of the components are omitted, and only a relative relation between an injection pipe 754a and the tank 710 is illustrated. A length of the injection pipe 754a corresponding to the tank 710 can be less than the radius of the circular profile. Therefore, during printing, the control module drives the injection pipe 754a to move along the radial direction of the circular profile (as shown by the arrow in FIG. 8) to apply the forming material. Other components of the three-dimensional printing apparatus such as the control module 740 and the curing module 730 and relevant descriptions thereof may be found in the aforementioned embodiments and will not be repeated herein.

The three-dimensional printing method of the present embodiment is performed with reference to the aforementioned step S401 to step S404 in FIG. 4, and by repeating step S401 to step S404, the three-dimensional object is formed in the end. In detail, the embodiment disclosed by FIG. 7 differs from that of FIG. 2 especially in the shape of the tank and the arrangement of the bottom. Accordingly, the arrangement manner of the injection module 750 in the three-dimensional printing apparatus 700, and the relative movement between the tank 710 and the platform 720 during step S403 are also different. For example, the control module 740 drives the tank 710 to rotate relative to the platform 720, and accordingly, the curing layer formed in step S402 is rotated with the platform 720 and is thus separated from the forming area 712 to move to a position corresponding to the separating area 714. Also, due to the stepped-shaped structure of the bottom of the tank 710, the curing layer is substantially suspended above the separating area 714. Specifically, the printing process from step S401 to step S404 further includes the following steps. First, the tank 710 or the platform 720 is driven, such that the tank 710 and the platform 720 perform relative rotation. In addition, during the rotation, the injection pipe 754 passes through the forming area 712 to apply the forming material to the forming area 712. Then, the forming material between the platform 720 and the forming area 712 is cured to form a curing layer. Afterward, the tank 710 or the platform 720 is driven, such that the tank 710 and the platform 720 perform relative rotation, and thus the curing layer is separated from the forming area 712 to move to the separating area 714.

In sum, the three-dimensional printing method of the disclosure is suitable for the aforementioned three-dimensional printing apparatus. The bottom of the tank of the three-dimensional printing apparatus is divided into the forming area and the separating area which are in a stepped shape, wherein the higher forming area is used as the area for forming the curing layer. The tank and the platform perform a relative movement therebetween, so as to separate the curing layer from the forming area by using a shear force, thereby facilitating the subsequent formation of the next curing layer. In addition, since the three-dimensional printing apparatus has the injection module disposed therein, at the same time of the relative movement during the printing process, the injection pipe in the injection module applies the forming material to the forming area, so as to continue to cure and stack the next curing layer. In other words, by the three-dimensional printing apparatus and the three-dimensional printing method of the disclosure, during every printing operation, the injection module only needs to perform injection for the layer to be printed, and the injection may be performed at the same time as the relative movement occurring during printing. Therefore, printing efficiency can be effectively improved.

It should be noted that, the aforementioned embodiments are only for illustrating the technical solutions of the disclosure, and do not limit the disclosure. Although the disclosure has been described in detail with reference to the aforementioned embodiments, it will be apparent to those skilled in the art that modifications may be made to the technical solutions described in the aforementioned embodiments, or equivalent replacements may be made to part of or all of the technical features thereof, and that these modifications or equivalent replacements do not make essence of a corresponding technical solution depart from the scope of the technical solutions of the embodiments of the disclosure.

What is claimed is:

1. A three-dimensional printing apparatus, comprising:
   a tank, having a forming area and a separating area on a bottom thereof, the forming area and the separating area being in a stepped shape and the forming area being higher than the separating area;
   an injection module, comprising a storage tank and an injection pipe connected to the storage tank, wherein a forming material is for being filled into the injection module, and the injection pipe passes through the forming area so as to apply the forming material to the forming area;
   a platform, movably disposed above the bottom of the tank;
   a curing module, disposed beside the tank or the platform, wherein the curing module is configured to cure the forming material between the platform and the fon ling area so as to form a curing layer on the platform; and
   a control module, electrically connected to the injection module, the curing module, and at least one of the tank and the platform, wherein the control module drives the tank and the platform to perform a relative movement, such that the platform switchably corresponds to the forming area and the separating area, wherein the platfoi in is configured to repeatedly move between the forming area and the separating area, when the platform moves from the forming area to the separating area, the injection module passes through the forming area and applies the forming material to the forming area, and when the platform moves from the separating area to the forming area, the injection module moves away from the forming area,
   wherein the injection pipe has a ball thereon, the ball is rotatably and movably disposed in a groove of the injection pipe, such that when the injection pipe passes through the forming area, the ball abuts the forming area and retracts toward the injection pipe, so as to apply the forming material to the forming area.

2. The three-dimensional printing apparatus as claimed in claim 1, wherein the storage tank is disposed above the injection pipe for flowing the forming material located inside the injection module from the storage tank to the injection pipe.

3. The three-dimensional printing apparatus as claimed in claim 1, wherein the storage tank is disposed below the injection pipe, and the storage tank or the injection pipe is connected to a pump for pumping the forming material located inside the injection module from the storage tank to the injection pipe.

4. The three-dimensional printing apparatus as claimed in claim 1, wherein the injection pipe has a hole thereon, an opening of the hole closely abuts against the bottom of the tank, and when the injection pipe passes through the forming area, the injection pipe is driven to move up to create a gap between the injection pipe and the forming area for flowing the forming material out of the injection pipe.

5. The three-dimensional printing apparatus as claimed in claim 1, wherein the separating area comprises a first separating area and a second separating area, and the forming area is located between the first separating area and the second separating area, the injection pipe is disposed between the platform and the tank, wherein the injection module passes through the forming area in a manner that the control module drives the tank to move relative to the injection module or that the control module drives the injection module to move relative to the tank.

6. The three-dimensional printing apparatus as claimed in claim 1, wherein the bottom of the tank has a circular profile and is controlled to rotate about a central axis, the injection pipe is disposed between the platform and the tank, and an extension direction of the injection pipe is disposed along a radial direction of the circular profile.

7. The three-dimensional printing apparatus as claimed in claim 6, wherein rotation angles of the forming area and the separating area relative to the circular profile are respectively 180 degrees.

8. The three-dimensional printing apparatus as claimed in claim 1, wherein the injection module passes through the forming area in a manner that the control module drives the tank to move relative to the injection module or that the control module drives the injection module to move relative to the tank.

9. The three-dimensional printing apparatus as claimed in claim 1, wherein the three-dimensional printing apparatus is a stereolithography (SL) apparatus or a digital light processing (DLP) apparatus.

\* \* \* \* \*